United States Patent
Kawarai et al.

(10) Patent No.: US 9,166,815 B2
(45) Date of Patent: Oct. 20, 2015

(54) COMMUNICATION APPARATUS AND COMMUNICATION CONTROLLING METHOD IN RING NETWORK

(75) Inventors: Kenichi Kawarai, Kanagawa (JP); Mami Sekido, Kanagawa (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 1329 days.

(21) Appl. No.: 12/723,583

(22) Filed: Mar. 12, 2010

(65) Prior Publication Data

US 2011/0064088 A1    Mar. 17, 2011

(30) Foreign Application Priority Data

Sep. 14, 2009    (JP) ................... 2009-211322

(51) Int. Cl.
*H04L 12/42* (2006.01)
*H04L 12/46* (2006.01)
*H04L 12/801* (2013.01)
*H04L 12/24* (2006.01)

(52) U.S. Cl.
CPC ............ *H04L 12/42* (2013.01); *H04L 12/4625* (2013.01); *H04L 47/10* (2013.01); *H04L 41/0654* (2013.01)

(58) Field of Classification Search
None
See application file for complete search history.

(56) References Cited

U.S. PATENT DOCUMENTS

2002/0018451 A1* 2/2002 Sharony ..................... 370/329
2006/0109802 A1* 5/2006 Zelig et al. ................. 370/258

FOREIGN PATENT DOCUMENTS

| JP | 6-237261 A | 6/1994 |
| JP | 6-338890 A | 12/1994 |
| JP | 2003-143169 A | 5/2003 |
| WO | WO 2006/082652 | 8/2006 |

OTHER PUBLICATIONS

Office Action for Japanese Patent Application No. 2009-211322 dated Feb. 5, 2013 and its English translation.

* cited by examiner

*Primary Examiner* — Jackie Zuniga Abad
(74) *Attorney, Agent, or Firm* — Ladas & Parry, LLP

(57) ABSTRACT

A ring connection apparatus according to one embodiment is provided with: a frame receiver that receives frames to be transmitted to one of the plurality of ring networks from each of the plurality of networks; and a frame transmitter that transmits each of frames, a passing frame to be transmitted from a device to another device inside said one ring network and a crossing frame to be transmitted to a device in said one ring network from a device in another ring network different from said one ring network, to said one ring network within the range of a band, which is separately determined in advance.

6 Claims, 6 Drawing Sheets

COMMUNICATION SYSTEM 100

COMMUNICATION SYSTEM 100

COMMUNICATION APPARATUS AND COMMUNICATION CONTROLLING METHOD IN RING NETWORK

CROSS-REFERENCE TO RELATED APPLICATIONS

This application claims priority to Japan Application No. 2009-211322 filed on Sep. 14, 2009, the disclosure of which is incorporated herein by reference.

BACKGROUND OF THE INVENTION

1. Field of the Invention

The present invention relates to data communication techniques and particularly to communication apparatuses that transmit data in ring networks and communication controlling methods.

2. Description of the Related Art

In communication apparatuses such as Layer 2 switches, in each unit of an input port or output port, bandwidth control is performed on data to be transmitted.

[Patent document 1] WO 2006/082652 pamphlet

In a ring network provided with a plurality of rings, a communication apparatus that connects the plurality of rings is often installed. A method, which is to be implemented in such a communication apparatus, of controlling bandwidth that takes into consideration the circumstances of a ring network provided with multiple rings has not been sufficiently suggested.

SUMMARY OF THE INVENTION

In this background, a main purpose of the present invention is to provide a technique for achieving preferred bandwidth control in an apparatus that interconnects multiple ring networks.

A communication apparatus in a ring network according to one embodiment of the present invention is an apparatus that interconnects a plurality of ring networks comprising: a frame receiver operative to receive a frame to be transmitted to one of the plurality of ring networks from each of the plurality of networks; and a frame transmitter operative to transmit each of frames, a passing frame to be transmitted from a device to another device inside said one ring network and a crossing frame to be transmitted to a device in said one ring network from a device in another ring network different from said one ring network, to said one ring network within the range of a band, which is separately determined in advance.

The "apparatus that interconnects a plurality of ring networks" may be a Layer 2 switch or a bridge that selects a path based on a data link layer of an OST reference model or may be a layer 3 switch or a router that selects a path based on a network layer. The "ring network" may be a ring network that uses a token bucket or a token ring as an access control method. The "frame" may be a data frame that is used as a transmission unit in a ring network and may be, for example, a MAC frame (Media Access Control frame). The "band" may be transmission line capacity for frame transmission, in other words, it may be bit rates. The band that is allocated to a passing frame and the band that is allocated to a crossing frame may have a same width or may have a different width.

According to the embodiment, bandwidth control can be performed separately on a passing frame and a crossing frame. In other words, bandwidth control can be performed on the traffic of communication inside a ring and the traffic of communication between rings based on a different policy. Therefore, the amount of bandwidth resources to be saved for the transmission of a passing frame and a crossing frame is reduced, and the efficient use of network resources can be achieved. Allocating different bands to a crossing frame on a ring-by-ring basis allows for various band services and priority control.

The frame receiver may associate identification information of a ring network from which a frame is transmitted with the frame, and the frame transmitter may identify whether the frame is a passing frame or a crossing frame depending on whether the ring network, which is identified by the identification information, from which the frame is transmitted is different from or identical to said one ring network.

A ring network to be connected is set in advance to the frame receiver and the frame transmitter. Therefore, according to the embodiment, whether the frame to be transmitted is a passing frame or a crossing frame can be easily identified inside the communication apparatus.

The frame receiver may add identification information of a ring network from which a frame is transmitted as data of the frame, and the frame transmitter may exclude the identification information from the data of the frame before transmitting the frame to said one ring network.

According to the embodiment, since the identification information of the ring network is added to the data of the frame, the frame transmitter can be easily notified of the identification information of the ring network, which is associated with the frame. A process related to a ring ID that is necessary for the bandwidth control for each frame type is completed inside the communication apparatus. In other words, a new function does not need to be provided to an apparatus outside the communication apparatus in order for the bandwidth control in the communication apparatus.

The frame transmitter may have a first transmitter that transmits a frame in a first direction in one ring network and a second transmitter that transmits a frame in a second direction that is different from the first direction in said one ring network. Each of the first transmitter and the second transmitter transmits the crossing frame to said one ring network so that the sum of the crossing frame transmitted in the first direction and the crossing frame transmitted in the second direction is within the range of a band, which is set to the crossing frame.

The first direction and the second direction may be opposite from each other in a same ring network. The "sum of the crossing frame transmitted in the first direction and the crossing frame transmitted in the second direction" may be the bands determined based on the sum, for example, the bit rates the entire crossing frames transmitted in both directions. According to the embodiment, when there are multiple interfaces that transmit data to one ring network from the communication apparatus, bandwidth control can be achieved for the sum of the data transmission amounts of the respective interfaces.

Each of the first transmitter and the second transmitter may notify, when a crossing frame to be transmitted to one ring network is a unicast frame, one another the data amount of the frame. In other words, when the crossing frame to be transmitted is a multicast frame or a broadcast frame, the transmitters may not need to notify one another the data amount of the frame.

In a communication apparatus in which a path is selected based on the data link layer or an Upper layer, a unicast frame is output from only one of multiple interfaces of a same ring network. Therefore, a unicast frame is preferred for the transmitters to notify each other of the amount of the transmission data. According to the embodiment, the first and the second transmitters each can derive the sum of the passing frames transmitted in the first direction and the crossing frames transmitted in the second direction by notifying each other of the data amount of unicast frames.

When a crossing frame to be transmitted to one ring network is a unicast frame, each of the first transmitter and the second transmitter may receive the unicast frame, and either of the transmitters may transmit the unicast frame to said one ring network in accordance with the destination of the unicast frame. According to the embodiment, even when a crossing frame is a unicast frame, both the first and the second transmitters receive the unicast frame, and the notification of the data amount between the first and the second transmitters is thus not necessary. This facilitates the implementation of the communication apparatus.

Another embodiment of the present invention relates to a communication controlling method in a ring network. This is a method of interconnecting a plurality of ring networks comprising: receiving a frame to be transmitted to one of the plurality of ring networks from each of the plurality of networks; and transmitting each of frames, a passing frame to be transmitted from a device to another device inside said one ring network and a crossing frame to be transmitted to a device in said one ring network from a device in another ring network different from said one ring network, to said one ring network within the range of a band, which is separately determined in advance. Effects similar to the above-described effects can be also achieved in the embodiment.

Optional combinations of the aforementioned constituent elements, or implementations of the invention in the form of apparatuses, methods, systems, programs, and recording mediums storing programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION OP THE INVENTION

Figure 1:
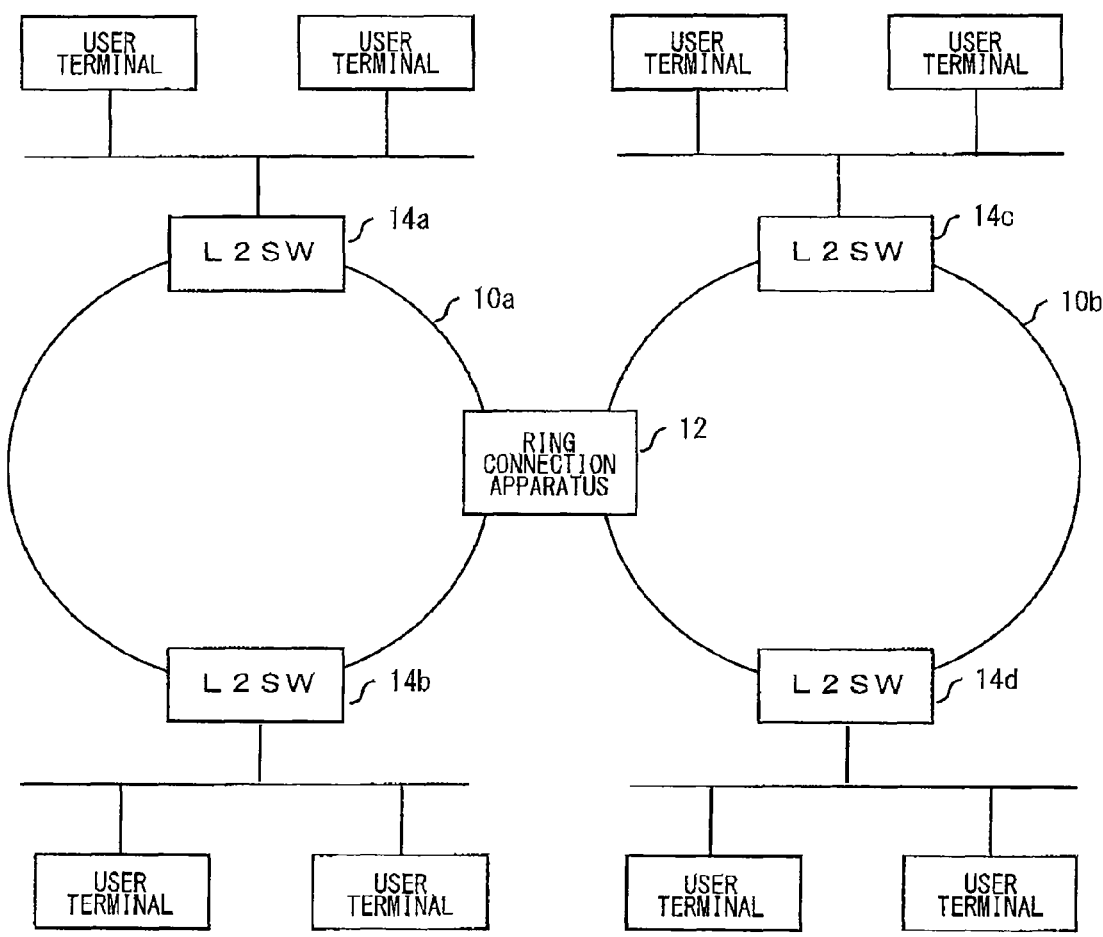
FIG. 1 is a diagram illustrating the configuration of a communication system according to an embodiment of the present invention.

The invention will now be described by reference to the preferred embodiments. This does not intend to limit the scope of the present invention but to exemplify the invention.

With regard to the embodiment of the present invention, a brief description is now given before explaining the configuration thereof.

In related-art communication apparatuses, in each unit of an input port or output port, bandwidth control is performed, classification is performed based on, for example, a VLAN (Virtual LAN) tag assigned to a data frame that has been input or TOS information of an IP header, and bandwidth control is performed according to the class of an input packet.

In a communication apparatus that interconnects multiple ring networks, when bandwidth control is performed in each unit of an input port or an output port, it is difficult to achieve bandwidth control where data frames to be transmitted within a first ring network (hereinafter, also referred to as "passing frames") are distinguished from data frames to be transmitted from a second ring network, which is different from the first ring network, to the first ring network (hereinafter, also referred to as "crossing frames"). This is because distinguishing passing frames from crossing frames is difficult since the passing frames and the crossing frames coexist in data frames that are input, respectively, from the first ring network and the second ring network, while using the same output ports.

Therefore, in conventional communication apparatuses, bandwidth control is performed based on the same bandwidth control policy where passing frames and crossing frames are treated to be the same frames. As a result, a band that is not required under normal conditions needs to be saved. Note that the term, "band," and the term, "bandwidth," used in the present specification mean transmission line capacity, for example, the bit rates when passing a frame from a communication apparatus.

A detailed description is now given of the above problem. With regard to a ring network comprising a first ring, a second ring, and a third ring, a communication apparatus that interconnects the first ring through the third ring is now taken into consideration. The transmission line capacity to be ensured for the transmission of data from a device in the first ring to another device, that is, the transmission line capacity for passing frames, is assumed to be 100 Mbps. The transmission line capacity to be ensured for the transmission of data from the second ring to the first ring and from the third ring to the first ring, that is, the transmission line capacity for crossing frames, is assumed to be 10 Mbps.

In this case, the transmission line capacity to be saved does not become 110 Mbps. This is because the transmission line capacity of 110 Mbps can be used only by the crossing frames since the passing frames and the crossing frames are not distinguished from each other. Therefore, a larger transmission line capacity needs to be ensured so as to save enough transmission line capacity for the passing frames. For example, in addition to ensuring the maximum transmission line capacity expected for the crossing frames, it is necessary to further ensure more transmission line capacity for the passing frames. As a result, the cost required for the network will be increased.

A ring connection apparatus, which is a communication apparatus that interconnects multiple rings, is suggested in the following. The ring connection apparatus identifies frames received from each ring of multiple rings, whether the frames are passing frames or crossing frames. The above problem is then solved by performing bandwidth control separately on the passing frames and the crossing frames based on respective bandwidth control policies that are different from each other. As a specific bandwidth control method, a publicly-known method may be employed. For example, a policing method or a shaping method may be employed.

FIG. 1 illustrates the configuration of a communication system according to an embodiment of the present invention. The communication system 100 is a ring network in which a first ring 10a and a second ring 10b are connected. The first ring 10a and the second ring 10b are connected to various devices that are in geographically different areas.

A Layer 2 switch (hereinafter, also referred to as an "L2SW") 14*a*, an L2SW 14*b*, and a ring connection apparatus 12 are connected to the first ring 10*a* in FIG. 1, and user terminals are connected to the L2SW 14*a* and the L2SW 14*b*. An L2SW 14*c*, an L2SW 14*d*, and the ring connection apparatus 12 are connected to the second ring 10*b*, and user terminals are connected to the L2SW 14*c* and the L2SW 14*d*. The ring connection apparatus 12 is a Layer 2 switch that interconnects the first ring 10*a* and the second ring 10*b* and relays passing frames and crossing frames.

A MAC frame transmitted and received between the user terminals connected to the L2SW 14*a* and the user terminals connected to the L2SW 14*b* corresponds to a passing frame in the communication system 100. A MAC frame transmitted and received between the user terminals connected to the L2SW 14*c* and the user terminals connected to the L2SW 14*d* also corresponds to a passing frame in the communication system 100. A MAC frame transmitted and received between the user terminals connected to the L2SW 14*a* or the L2SW 14*b* and the user terminals connected to the L2SW 14*c* or the L2SW 14*d* corresponds to a crossing frame in the communication system 100.

Figure 2:
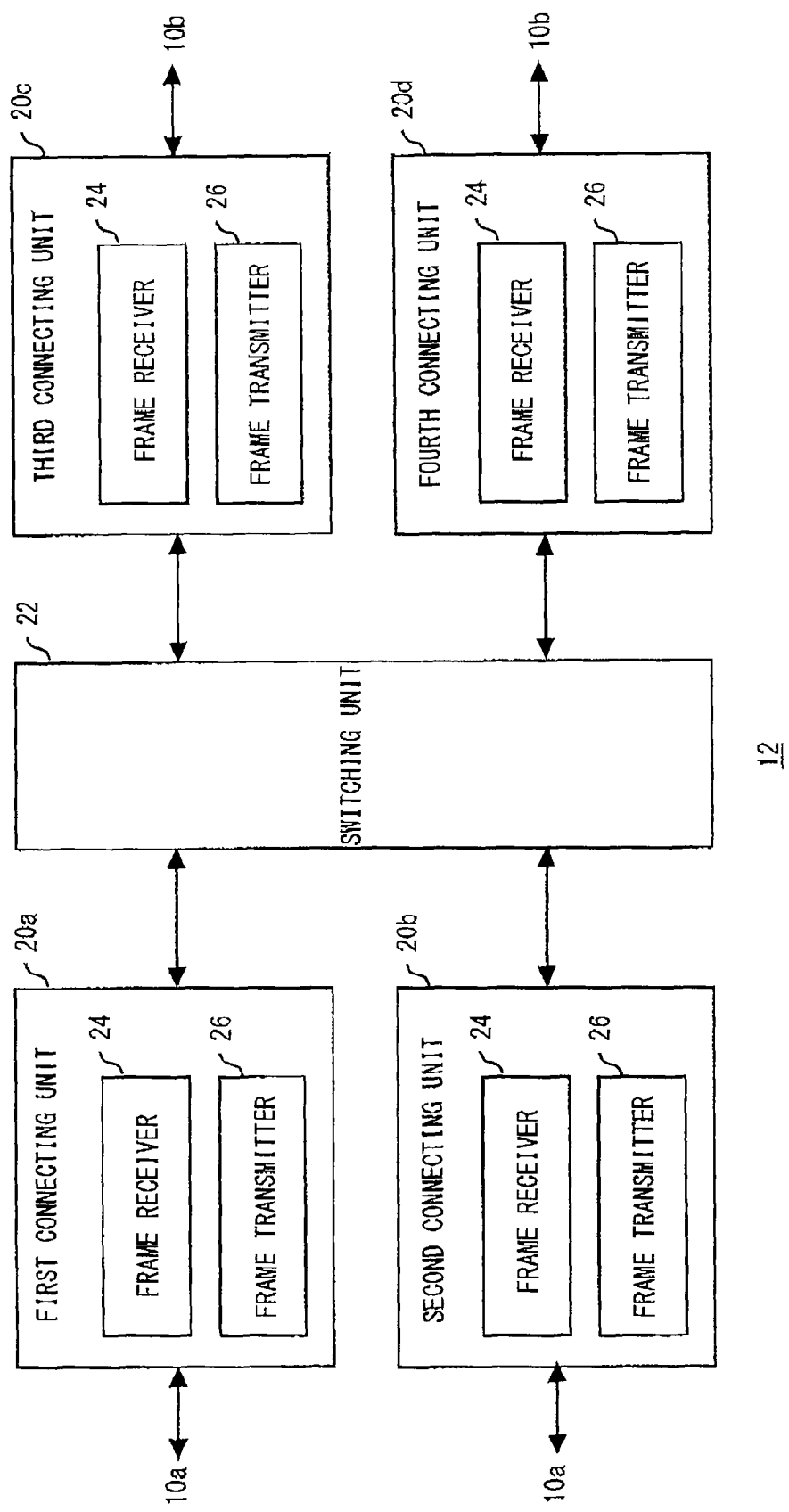
FIG. 2 is a block diagram illustrating a functional configuration of a ring connection apparatus in FIG. 1.

FIG. 2 is a block diagram illustrating a functional configuration of a ring connection apparatus 12 in FIG. 1. The blocks shown in the block diagram of the specification are implemented in the hardware by any CPU of a computer, other elements, or mechanical devices and in software by a computer program or the like. FIG. 2 depicts functional blocks implemented by the cooperation of hardware and software. Thus, a person skilled in the art should appreciate that there are many ways of accomplishing these functional blocks in various forms in accordance with the components of the combination of hardware and software.

The ring connection apparatus 12 is provided with a first connecting unit 20*a*, a second connecting unit 20*b*, a third connecting unit 20*c*, a fourth connecting unit 20*d*, and a switching unit 22. The first connecting unit 20*a* and the second connecting unit 20*b* provide the function of interfacing the first ring 10*a*, and the third connecting unit 20*c* and the fourth connecting unit 20*d* provide the function of interfacing the second ring 10*b*. The first connecting unit 20*a* through the fourth connecting unit 20*d* each have a frame receiver 24, which receives a passing frame and a crossing frame and a frame transmitter 26, which transmits a passing frame and a crossing frame. The first connecting unit 20*a* through the fourth connecting unit 20*d* may be implemented as line cards.

The frame receiver 24 of the first connecting unit 20*a* receives a MAC frame that is transmitted in the first ring 10*a* in a first direction, for example, the clockwise direction in FIG. 1. The frame transmitter 26 of the first connecting unit 20*a* transmits a MAC frame that is transmitted in the first ring 10*a* in a second direction, for example, a counterclockwise direction in FIG. 1. On the other hand, the frame receiver 24 of the second connecting unit 20*b* receives a MAC frame that is transmitted in the second direction in the first ring 10*a*. The frame transmitter 26 of the second connecting unit 20*b* transmits a MAC frame that is transmitted in the first direction in the first ring 10*a*. Similarly, the third connecting unit 20*c* and the fourth connecting unit 20*d* transmit and receive Mac frames in different directions in the second ring 10*b*.

The MAC frame, which is transmitted to the first ring and which is a unicast frame, is transmitted from either the frame transmitter 26 of the first connecting unit 20*a* or the frame transmitter 26 of the second connecting unit 20*b*. On the other hand, a multicast frame and a broadcast frame are transmitted from both of the frame transmitters 26. In other words, a multicast frame and a broadcast frame are transmitted in both the clockwise direction and the counterclockwise direction in the first ring 10*a*. The same applies to a MAC frame that is transmitted to the second ring.

The switching unit 22 retains a MAC address table (not shown) and performs path control on a MAC frame. More specifically, in reference to the MAC address table, a connecting unit to which the MAC frame is to be transmitted is determined for the MAC frame that has been received by the first connecting unit 20*a* through the fourth connecting unit 20*d* in accordance with the destination MAC address. The switching unit 22 transmits the MAC frame to at least one unit among the first connecting unit 20*a* through the fourth connecting unit 20*d* that corresponds to the connecting unit to which the MAC frame is to be transmitted.

Figure 3:
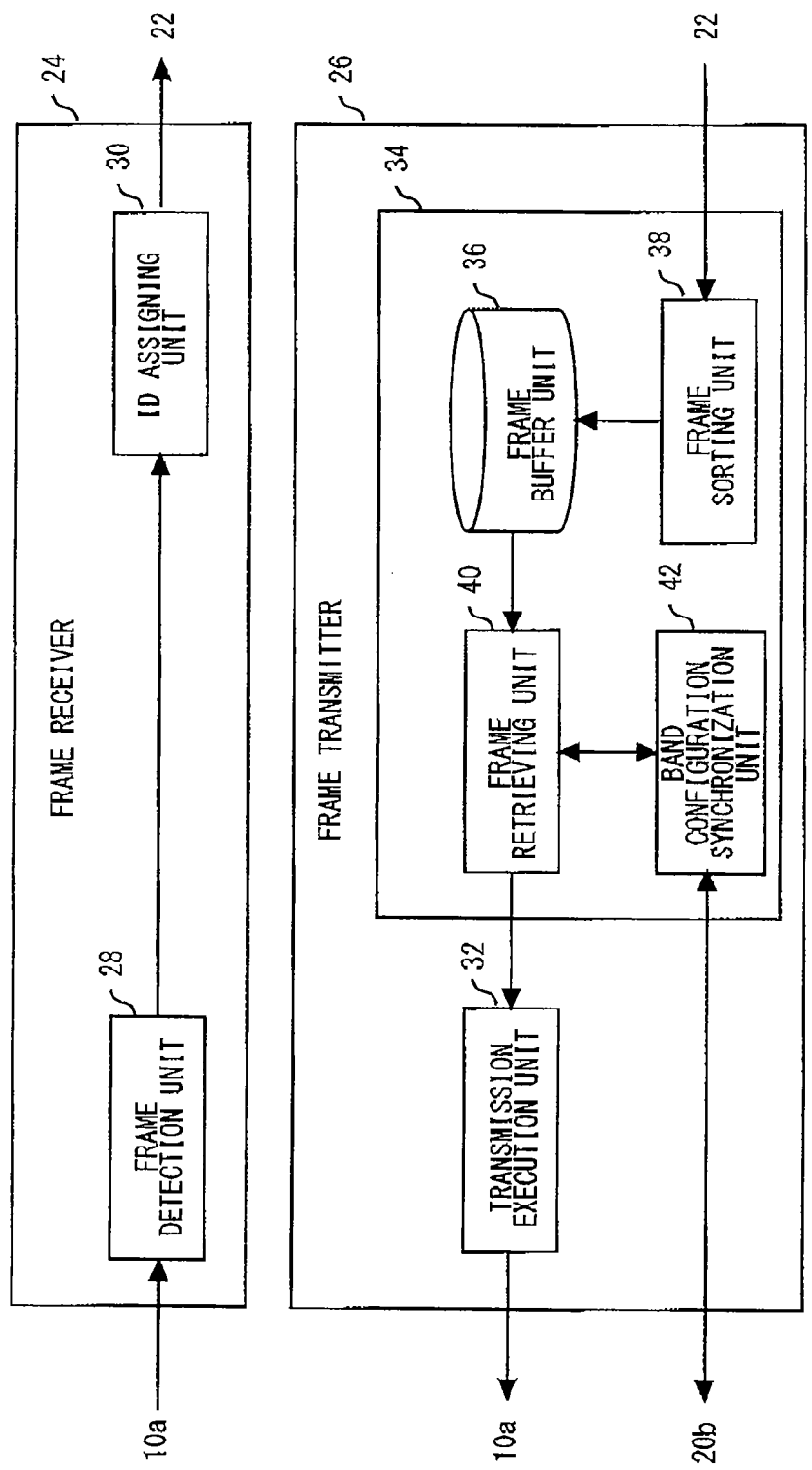
FIG. 3 is a block diagram illustrating a detailed configuration of a first connecting unit in FIG. 2.

FIG. 3 is a block diagram illustrating a detailed configuration of a first connecting unit 20*a* in FIG. 2. The frame receiver 24 includes a frame detection unit 28 and an ID assigning unit 30. The frame transmitter 26 includes a transmission execution unit 32 and a bandwidth control unit 34.

The frame detection unit 28 detects and acquires a MAC frame from a bit sequence flowing in the first ring 10*a*. The ID assigning unit 30 adds the ID, which is predetermined to the ring that has received the MAC frame, that is, the first ring 10*a*, to the header of the MAC frame and then transmits the MAC frame to the switching unit 22.

Figure 4:
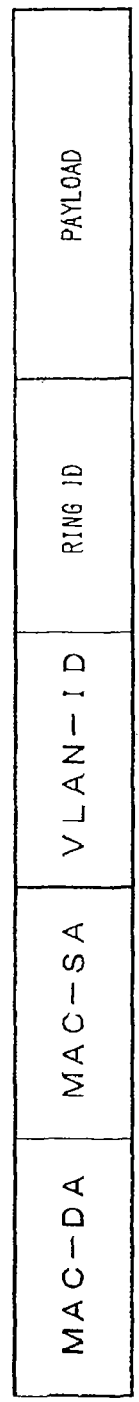
FIG. 4 is a schematic diagram of a MAC frame transmitted from an ID assigning unit.

FIG. 4 is a schematic diagram of a MAC frame transmitted from an ID assigning unit 30. In the figure, an address, "MAC-DA," is the destination MAC address, and an address, "MAC-SA," is the source MAC address. These are set by, for example, user terminals connected to the L2SW 14*a* or the L2SW 14*b*. A "VLAN-ID" is the ID of the VLAN used for virtually grouping user terminals. These are set by, for example, the L2SW 14*a* or the L2SW 14*b*. A "ring ID" is identification information, which is added by the ID assigning unit 30, that indicates the ring of the transmission source of a MAC frame. A "payload" is the actual data of a MAC frame and is, for example, an IF packet. In the figure, a TPID, other VLAN tags, etc., are omitted. However, they may be included in a MAC frame as appropriate. FIG. 3 is referred back.

The transmission execution unit 32 transmits to the first ring 10*a* the bit sequence of the MAC frame (a passing frame and a crossing frame) transmitted from a bandwidth control unit, which will be described hereinafter. The bandwidth control unit 34 performs a bandwidth control process on the MAC frame received from the switching unit 22 based on a predetermined bandwidth control policy. The bandwidth control unit 34 includes a frame buffer unit 36, a frame sorting unit 38, a frame retrieving unit 40, and a band configuration synchronization unit 42.

The frame buffer unit 36 is a memory area provided with a passing-frame queue, which is for temporarily retaining a passing frame, and with a crossing-frame queue, which is for temporarily retaining a crossing frame.

The frame sorting unit 38 receives a MAC frame from the switching unit 22. When the ring ID of the MAC frame and the ID of a ring to which a frame is transmitted by the transmission execution unit 32, in this case, the ID of the first ring 10*a*, are identical, the frame sorting unit 38 identifies the MAC frame as a passing frame. The MAC frame is then stored in the passing-frame queue. When the ring ID of the received MAC frame is different from the ID of the first ring 10*a*, the frame sorting unit 38 identifies the MAC frame as a crossing frame. The MAC frame is then stored in the crossing-frame queue.

The frame retrieving unit 40 retrieves a passing frame from the passing-frame queue and transmits the passing frame to the transmission execution unit 32 within the upper limit of the bit rate range that is predetermined for a passing frame. The frame retrieving unit 40 retrieves a crossing frame from the crossing-frame queue and transmits the passing frame to the transmission execution unit 32 within the upper limit of the bit rate range that is predetermined for a crossing frame. Typically, the upper limit bit rate for a passing frame is set to be larger than the upper limit bit rate for a crossing frame. Each upper Limit bit rate may be determined, as appropriate, according to the requirement of a user for the communication system 100.

It is desirable for the frame sorting unit 38 to delete the ring ID from a MAC frame after identifying the type of the MAC frame, which has been received from the switching unit 22, that is, identifying whether the MAC frame is a passing frame or a crossing frame, but before storing the MAC frame in a queue. Alternatively, it is desirable for the frame retrieving unit 40 or the transmission execution unit 32 to delete the ring ID from the MAC frame. In this manner, the MAC frame to be transmitted from the ring becomes a normal MAC frame from which the ring ID is excluded. As a result, a special means for dealing with the ring ID is not necessary for other apparatuses in the communication system 100.

The band configuration synchronization unit 42 determines whether or not the MAC frame (a passing frame and a crossing frame) retrieved from the frame buffer unit 36 by the frame retrieving unit 40 is a unicast frame, based on the destination MAC address. When the MAC frame that has been retrieved is a unicast frame, the band configuration synchronization unit 42 notifies another connecting unit that transmits a MAC frame to the same ring, that is, the band configuration synchronization unit 42 of the second connecting unit 20b, of the data amount of the MAC frame that has been retrieved. The data amount of a passing frame and the data amount of a crossing frame are notified separately.

The band configuration synchronization unit 42 receives from the band configuration synchronization unit 42 of the second connecting unit 20b the notification of the data amount of the MAC frame (a passing frame and a crossing frame) to be transmitted to the first ring 10a by the second connecting unit 20b. The band configuration synchronization unit 42 notifies the frame retrieving unit 40 of the information regarding the data amount, and the frame retrieving unit 40 adjusts the upper limit bit rate from the frame buffer unit 36.

An explanation is given of when the frame retrieving unit 40 of the first ring 10a receives the notification of the data amount of a crossing frame to be transmitted by the second connecting unit 20b. In this case, the frame retrieving unit 40 retrieves a crossing frame from the crossing-frame queue so that the bit rate determined by the sum of the data amount of a crossing frame that has been notified and the data amount of a crossing frame that has been retrieved by the frame retrieving unit 40 stays within the range of the upper limit bit rate that has been set in advance for a crossing frame. A similar process is performed separately on a passing frame.

For example, a situation where the upper limit bit rate for a crossing frame to be transmitted to the first ring 10a is 10 Mbps is now taken into consideration. When there is no notification from the second connecting unit 20b, the upper limit for retrieving the crossing frame per unit time (for example, 100 μs) in the frame retrieving unit 40 is 1000 bytes. Upon the notification from the second connecting unit 20b indicating that the retrieving amount of the crossing frame is 400 bytes, the frame retrieving unit 40 adjusts the upper limit for retrieving per unit time to be 600 bytes. When subsequently retrieving a crossing frame, the retrieving amount per unit time is readjusted based on the data amount as notified at that time.

As described above, the respective band configuration synchronization units 42 of the multiple connecting units that transmit a passing frame and a crossing frame to the same ring notify one another of the amount of the transmission data of the passing frame and the amount of the transmission data of the crossing frame. This allows for the bandwidth control of the total amount of passing frames transmitted from each of the connecting units and for the bandwidth control of the total amount of crossing frames to be achieved.

The functional configuration of the first connecting unit 20a is shown in FIG. 3. The same applies to the functional configurations of the second connecting unit 20b, the third connecting unit 20c, and the fourth connecting unit 20d. Note that the frame detection units 28 of the third connecting unit 20c and the fourth connecting unit 20d acquire MAC frames from the second ring 10b and the transmission execution units 32 transmit MAC frames to the second ring 10b. The band configuration synchronization units 42 of the third connecting unit 20c and the fourth connecting unit 20d notify one another of the data amount of the MAC frames to be transmitted to the second ring 10b.

Figure 5:
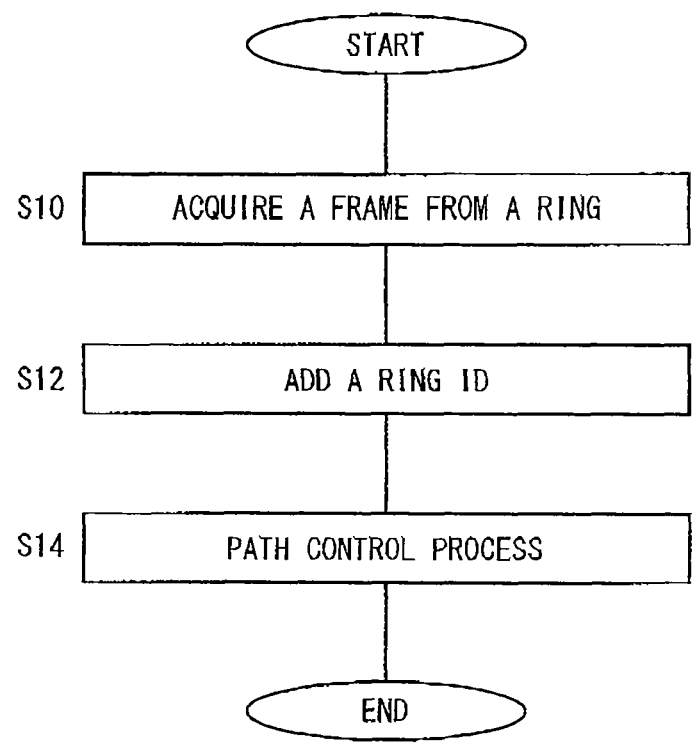
FIG. 5 is a flowchart illustrating the operation of a frame receiver and a switching unit.

An explanation is given of the operation of the ring connection apparatus 12 having the above-stated configuration in the following. FIG. 5 is a flowchart illustrating the operation of the frame receiver 24 and the switching unit 22. The frame detection unit 28 acquires a MAC frame from a ring to which the frame detection unit 28 is connected (S10). The ID assigning unit 30 adds the ID of a ring of the transmission source of the MAC frame to the header area of the acquired MAC frame and transmits the MAC frame to the switching unit 22 (S12). The switching unit 22 performs path control on the MAC frame in accordance with the destination MAC address of the MAC frame and then transmits the MAC frame to a connecting unit, which is determined based on the MAC address table (S14).

Figure 6:
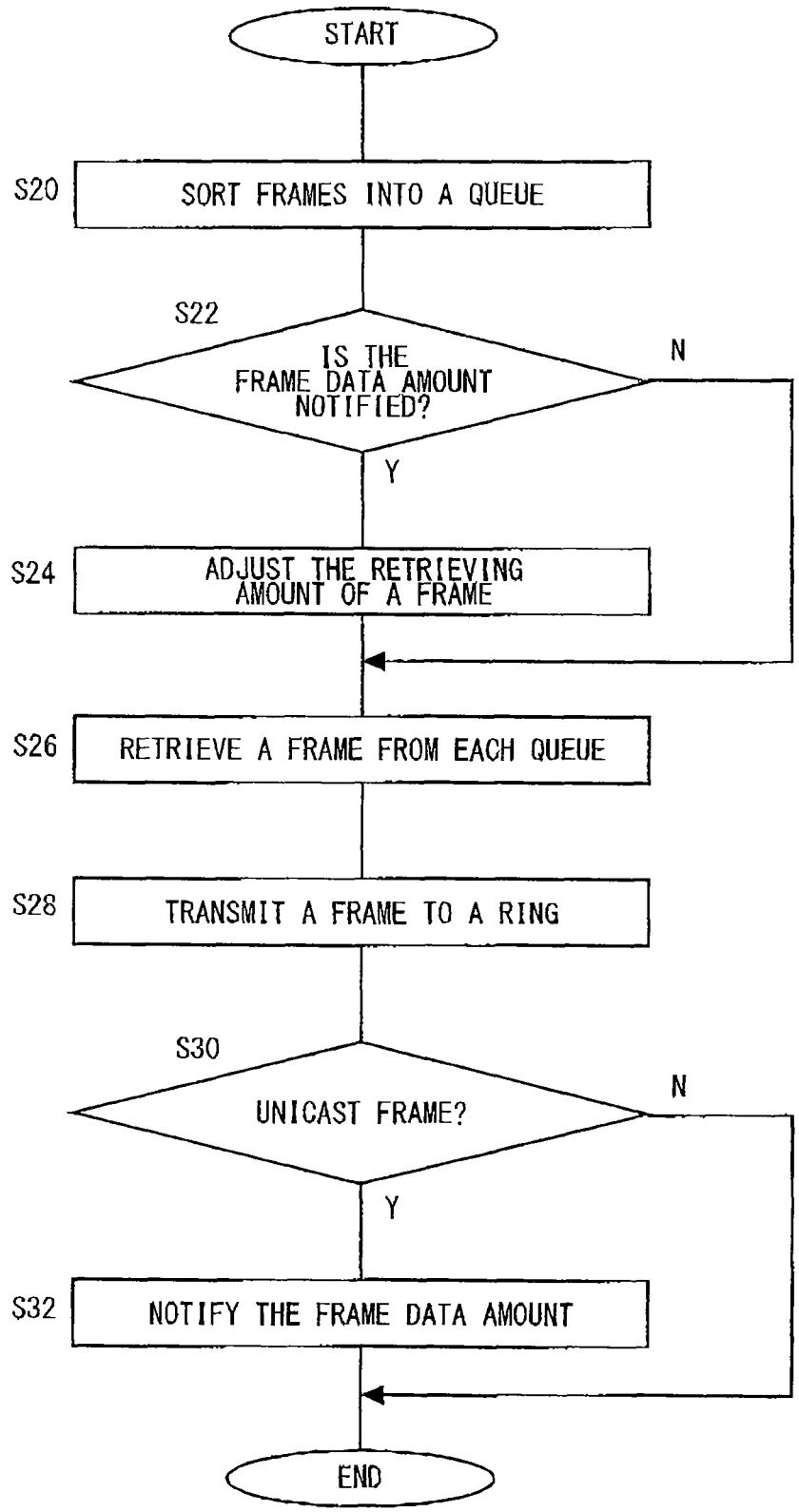
FIG. 6 is a flowchart illustrating the operation of a frame transmitter.

FIG. 6 is a flowchart illustrating the operation of the frame transmitter 26. The frame sorting unit 38 identifies the MAC frame, whether the MAC frame is a passing frame or a crossing frame according to the ring ID of the MAC frame received from the switching unit 22. The frame sorting unit 38 allows the passing-frame queue in the frame buffer unit 36 to store a passing frame and allows the crossing-frame queue in the frame buffer unit 36 to store a crossing frame (S20). When a notification is made, from one other frame transmitter 26 that transmits data to the same ring in the opposite direction, of the data amount of the passing frame and the data amount of the crossing frame that are retrieved by said other frame transmitter 26 (Y in S22), the frame retrieving unit 40 acquires the notification via the band configuration synchronization unit 42. The frame retrieving unit 40 adjusts the upper limit for retrieving a passing frame and the upper limit for retrieving a crossing frame in accordance with the contents of the notification (S24). When the notification is not received (N in S22), S24 is skipped.

The frame retrieving unit 40 retrieves a passing frame from the passing-frame queue within the upper limit of the range for retrieving a notification frame. The frame retrieving unit 40 retrieves a crossing frame from the crossing-frame queue within the range of the upper limit for retrieving a crossing frame (S26). The transmission execution unit 32 transmits to the ring to which the transmission execution unit 32 is connected the passing frame and the crossing frame that are retrieved from the frame retrieving unit 40 (S28). When the crossing frame retrieved by the frame retrieving unit 40 is a unicast frame (Y in S30), the band configuration synchronization unit 42 notifies one other frame transmitter 26, which transmits data to the same ring in the opposite direction, of the data amount of the crossing frame (S32). When the crossing frame is not a unicast frame (N in S30), S32 is skipped. The processed in S30 and S32 are also performed on a passing frame in a similar manner.

Described above is an explanation based on the embodiments of the present invention. These embodiments are intended to be illustrative only, and it will be obvious to those skilled in the art that various modifications to constituting elements and processes could be developed and that such modifications are also within the scope of the present invention. An exemplary variation is shown in the following.

A first exemplary variation is now described in detail. In the above embodiment, the switching unit 22 transmits a unicast frame, which is a crossing frame, to one frame transmitter 26 among two frame transmitters 26 that are connected to a destination ring network according to the destination. In the exemplary variation, the switching unit 22 transmits a unicast frame, which is a crossing frame, to both of the two frame transmitters 26 that are connected to a destination ring network. In other words, path control, which is similar to the path control performed on a multicast frame, is performed on a unicast frame. Note that the switching unit 22 transmits identification information that allows for the identification of a unique frame transmitter 26, from which the unicast frame is to be actually transmitted to the ring network, in association with the unicast frame. The identification information may be the identification number of a line card, which is set to the connecting unit in advance.

Two frame transmitters 26 that have received respective unicast frames adjust the upper limits for retrieving crossing frames in accordance with the data amounts of the respective unicast frames. One of the frame transmitters 26, which has been specified by the identification information, transmits the unicast frames to the ring network. The other one of the frame transmitters 26 discards the unicast frames. According to the exemplary variation, the unicast frame to be transmitted to the ring network becomes the information required for bandwidth control, and the notification of the data amount of the unicast frame between the frame transmitters 26 becomes unnecessary. Thus, the implementation of the ring connection apparatus 12 is facilitated.

A second exemplary variation is now described in detail. In the above embodiment, an example is shown of bandwidth control based on the classification between a passing frame and a crossing frame. In the exemplary variation, passing frames may be divided into further detailed classifications based on the setting information of a frame received from a ring, and crossing frames may be divided into further detailed classifieds in a similar manner. For example, frames may be classified by using the VLAN-ID or the TOS information of the IF header as a parameter. When the VLAN-ID is used as a parameter, a frame may be classified as: a "passing frame with VLAN-ID '1'"; a "passing frame with VLAN-ID '2'"; a "crossing frame with VLAN-ID '1'"; and a "crossing frame with VLAN-ID '2'".

A third exemplary variation is now described in detail. In the above embodiment, the same bandwidth control is performed on a frame, which is received from a ring and transmitted to a different ring, as a crossing frame, regardless of the ring from which the frame is transmitted. In the exemplary variation, crossing frames may be divided into detailed classifications for every ring from which the frames are transmitted, and a different bandwidth control method may be performed on a crossing frame transmitted from a different ring.

A fourth exemplary variation is now described in detail. In the above embodiment, a shaping method is performed as a bandwidth control method. In the exemplary variation, a policing method may be performed as a bandwidth control method. In this case, it is not always necessary to provide the frame buffer unit 36, and the frame retrieving unit 40 may directly acquire passing frames and crossing frames from the frame sorting unit 38 in accordance with respective retrieving upper limits. Passing frames and crossing frames exceeding the respective retrieving upper limits may be discarded.

Optional combinations of the aforementioned embodiment and exemplary variations will also be within the scope of the present invention. New embodiments resulting from the combinations have combined effects of the embodiments and exemplary variations that are combined.

Therefore, it will be obvious to those skilled in the art that the function to be achieved by each constituent requirement described in the claims may be achieved by each constituting element shown in the embodiments and in the modifications or by a combination of the constituting elements.

What is claimed is:

1. A communication apparatus in a ring network that interconnects a plurality of ring networks comprising:
    a frame receiver operative to receive a frame to be transmitted to a target ring network of the plurality of ring networks from each of the plurality of ring networks; and
    a frame transmitter operative to transmit:
    a passing frame to be transmitted from a first device within said target ring network to a second device within said target ring network, within a first data amount predefined for the passing frame, and
    a crossing frame, to be transmitted to a device in said target ring network from a device in another ring network different from said target ring network that is within a second data amount for the crossing frame predefined separately from the first data amount, wherein the frame transmitter comprises:
    a first transmitter configured to transmit a frame in a first direction in said target ring network; and
    a second transmitter configured to transmit a frame in a second direction in said target ring network, said second direction being different from the first direction, wherein each of the first transmitter and the second transmitter transmits the crossing frame to said target ring network so that the sum of a data amount of the crossing frame transmitted in the first direction and a data amount of the crossing frame transmitted in the second direction is within the second data amount, and
    wherein said sum is within the second data amount when a bit rate determined by said sum is within a predefined upper limit bit rate for a crossing frame.

2. The communication apparatus according to claim 1, wherein
    the frame receiver associates the identification information of a ring network from which a frame is transmitted with the frame, and
    the frame transmitter identifies whether the frame is a passing frame or a crossing frame depending on whether the ring network, which is identified by the identification information, from which the frame is transmitted is different from or identical to said target ring network.

3. The communication apparatus according to claim 2, wherein
    the frame receiver adds, as the data of the frame, the identification information of a ring network from which a frame is transmitted, and
    the frame transmitter excludes the identification information from the data of the frame before transmitting the frame to said target ring network.

4. The communication apparatus according to claim 1, wherein each of the first transmitter and the second transmitter notifies, when a crossing frame to be transmitted to said target ring network is a unicast frame, one another of the data amount of the frame.

5. The communication apparatus according to claim 1, wherein, when a crossing frame to be transmitted to said target ring network is a unicast frame, each of the first transmitter and the second transmitter receives the unicast frame, and wherein either of the transmitters transmits the unicast frame to said target ring network in accordance with the destination of the unicast frame.

6. A communication controlling method of interconnecting a plurality of ring networks comprising:
- receiving, using a frame receiver of a communication apparatus, a frame to be transmitted to a target ring network of the plurality of ring networks from each of the plurality of ring networks; and
- transmitting, using a frame transmitter of the communication apparatus:
  - a passing frame to be transmitted from a first device within said target ring network to a second device within said target ring network, within a first data amount predefined for the passing frame, and
  - a crossing frame to be transmitted to a device in said target ring network from a device in another ring network, which is different from said target ring network and which is within a second data amount for the crossing frame predefined separately from the first data amount, wherein the frame transmitter comprises:
- a first transmitter configured to transmit a frame in a first direction in said target ring network; and
- a second transmitter configured to transmit a frame in a second direction in said target ring network different from the first direction, wherein said transmitting comprises transmitting, using each of the first and second transmitters, the crossing frame to said target ring network so that the sum of a data amount of the crossing frame transmitted in the first direction and a data amount of the crossing frame transmitted in the second direction is within the second data amount, and wherein said sum is within the second data amount when a bit rate determined by said sum is within a predefined upper limit bit rate for a crossing frame.

* * * * *